United States Patent
McKinney et al.

(10) Patent No.: US 10,556,389 B1
(45) Date of Patent: Feb. 11, 2020

(54) RECIRCULATING LINEAR FEED MECHANISM

(71) Applicant: NORTHROP GRUMMAN SYSTEMS CORPORATION, Falls Church, VA (US)

(72) Inventors: Kenneth F. McKinney, San Diego, CA (US); Andrew Simmons, San Diego, CA (US); Kenneth Weidele, San Diego, CA (US); Tim Manestitaya, San Diego, CA (US); Alex Grammar, San Diego, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 383 days.

(21) Appl. No.: 15/419,843

(22) Filed: Jan. 30, 2017

(51) Int. Cl.
| | |
|---|---|
| *B29C 64/20* | (2017.01) |
| *B29C 64/205* | (2017.01) |
| *B29C 64/118* | (2017.01) |
| *B29C 67/00* | (2017.01) |
| *B33Y 30/00* | (2015.01) |
| *B29C 64/106* | (2017.01) |

(52) U.S. Cl.
CPC ........ *B29C 67/0085* (2013.01); *B29C 64/106* (2017.08); *B29C 64/20* (2017.08); *B29C 67/0055* (2013.01); *B33Y 30/00* (2014.12)

(58) Field of Classification Search
None
See application file for complete search history.

(56) References Cited

U.S. PATENT DOCUMENTS

| | | | |
|---|---|---|---|
| 3,016,451 A | | 1/1962 | Cornell, Jr. |
| 4,117,873 A | * | 10/1978 | Crawford .................. B21F 1/04 |
| | | | 140/105 |
| 5,529,652 A | | 6/1996 | Asai et al. |
| 5,764,521 A | | 6/1998 | Batchelder et al. |
| 5,900,207 A | | 5/1999 | Danforth et al. |
| 7,896,209 B2 | | 3/2011 | Batchelder et al. |
| 7,897,074 B2 | | 3/2011 | Batchelder et al. |
| 8,236,227 B2 | | 8/2012 | Batchelder et al. |
| 8,439,665 B2 | | 5/2013 | Batchelder et al. |
| 8,926,882 B2 | | 1/2015 | Batchelder et al. |
| 9,050,753 B2 | | 6/2015 | Rodgers et al. |
| 9,321,609 B2 | | 4/2016 | Koop et al. |

(Continued)

OTHER PUBLICATIONS

McKinney, Kenneth F. Utility U.S. Appl. No. 15/345,289, filed Nov. 7, 2016, entitled "Helical Filament Feed Mechanism for Fused Deposition Modeling".

*Primary Examiner* — Jacob T Minskey
*Assistant Examiner* — Baileigh Kate Darnell
(74) *Attorney, Agent, or Firm* — John A. Miller; Shumaker, Loop & Kendrick, LLP

(57) ABSTRACT

A feed mechanism for feeding a filament through a print head assembly in an FDM printer. The feed mechanism includes a first oval-shaped track having a plurality track elements extending around the first track and a second oval-shaped track having a plurality of track elements extending around the second track, where the first and second tracks counter-rotate. A space is defined between the first and second tracks that receives the filament in a manner so that the track elements that are in the space contact the filament, where rotation of the first and second tracks in opposite directions causes the filament to be driven through the space and onto the print head.

17 Claims, 2 Drawing Sheets

(56) References Cited

U.S. PATENT DOCUMENTS

2009/0295032 A1    12/2009   Hopkins
2015/0084222 A1    3/2015   Heston et al.
2016/0031159 A1    2/2016   Church et al.

\* cited by examiner

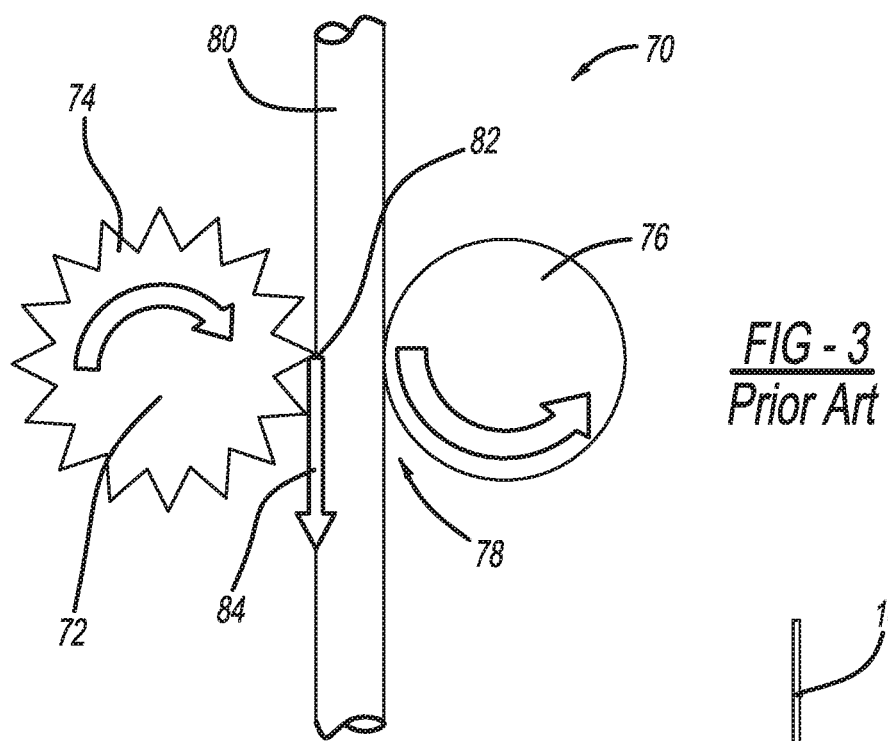
*FIG - 3*
*Prior Art*
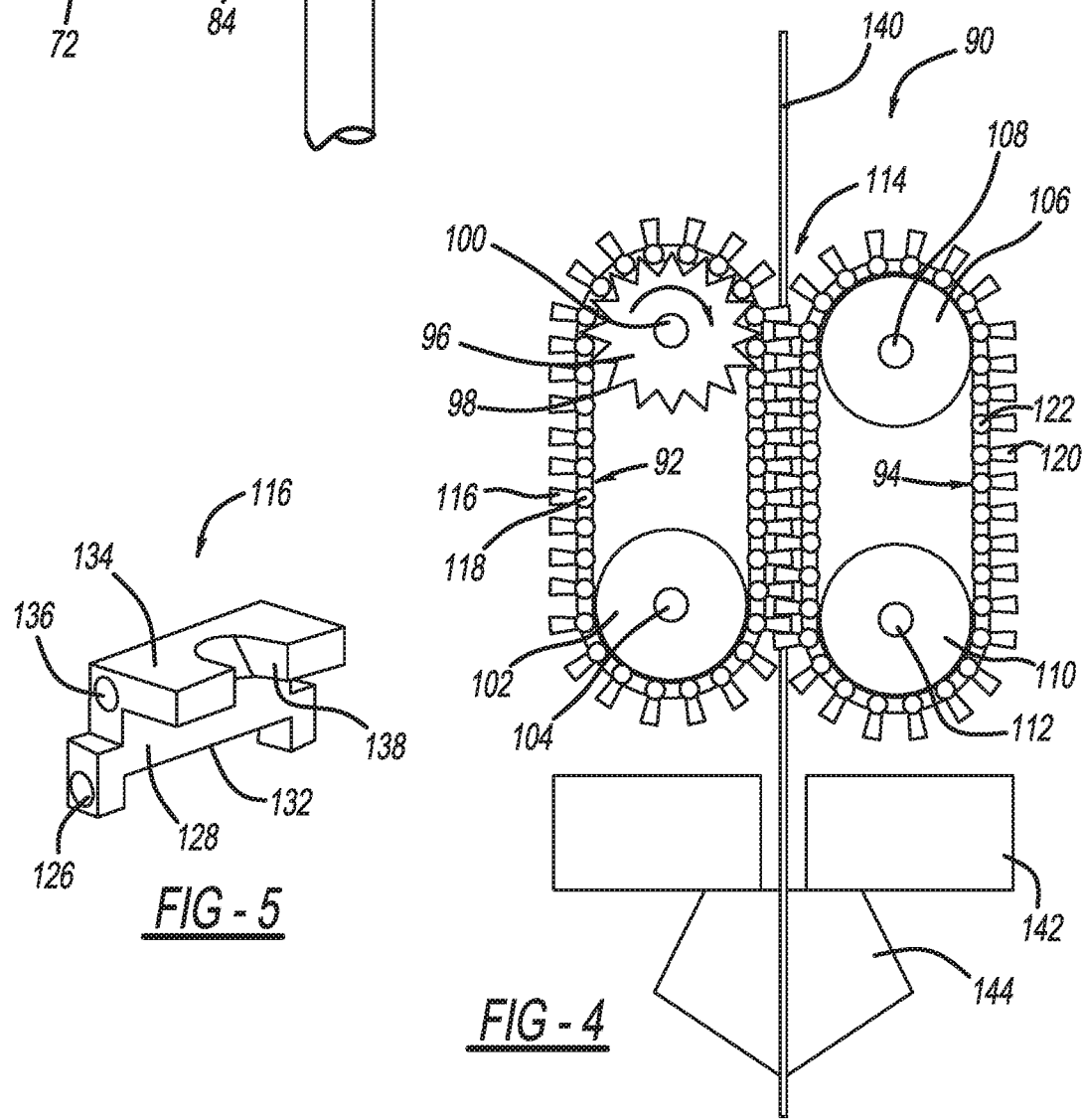
*FIG - 5*
*FIG - 4*

RECIRCULATING LINEAR FEED MECHANISM

BACKGROUND

Field

This invention relates generally to a feed mechanism for feeding a filament through a print head in a fused deposition modeling (FDM) printer and, more particularly, to a feed mechanism for feeding a filament into a nozzle in a print head of an FDM printer, where the feed mechanism includes two counter-rotating tank tread type drive elements.

Discussion

Fused deposition modeling (FDM) is an additive manufacturing (AM) technology and is a technique used for 3D printing. More specifically, FDM is a process where a material is laid down layer by layer from a spool of material that is fed into a heated nozzle as a filament to build a desired product. The material from the spool is fed into the heated nozzle, which causes the material to become molten, where the molten material immediately begins to harden once it is extruded from the nozzle. A typical filament for these types of printers will have a diameter of 1.75 mm or 3 mm. FDM utilizes software that processes a stereolithography file (STL) file and includes mathematically slicing and orienting the model to build up the product layer by layer. Support structures may also be built layer by layer using a second spool of material, for example, a soluble material may be provided to build a soluble support structure.

Various materials may be used for FDM, such as acrylonitrile butadiene styrene (ABS), polylactic acid (PLA), polycarbonate (PC), polyamide (PA), polystyrene (PS), lignin, rubber, carbon fibers, thermoplastics, polyphenylsufone, ultra high molecular weight polyethylene (UHMWPE) Dyneema, Ultem 9085, high impact polystyrene (HIPS), nylon, high density polyethylene (HDPE) eutectic materials, plasticine, room temperature vulcanization (RTV) silicone, etc. Typically the material is selected to increase the structural properties of the printed products that are made therefrom.

Some printing filaments have additional materials added to provide different electrical, mechanical and/or cosmetic properties. Some of these materials can dramatically increase the thermal conductivity of the filament. During the printing process, the hot end of the printer will heat the filament, where heat will move through the filament towards the source of the filament. For filaments with a high thermal conductivity, this heat transfer can cause the filament entering the printer to approach its glass transition temperature, which softens the filament and reduces the effectiveness of the feed mechanism.

A feed mechanism is employed in a print head assembly of the FDM printer that feeds the filament to the nozzle from which it is extruded. The distance between the feed mechanism and the nozzle varies from printer to printer, and can be, for example, in the range of 75 mm-1 m. It is critical that the feed mechanism feeds the filament into the nozzle at a constant rate so that the heated material is properly laid down to form the product. The feed rate is generally a function of the temperature of the nozzle and the force applied by the feed mechanism to the filament. The ability of the feed mechanism to properly feed the filament to the nozzle is also often highly reliant on the type of material being fed. For some materials it is not uncommon that the filament gets jammed within the feed mechanism and is prevented from being provided to the nozzle, possibly a result of the nozzle being at a too low of temperature or the filament buckling between the feed mechanism and the nozzle. Further, heat can be transferred from the nozzle up the filament as it is being fed, possibly causing the filament to approach its glass transition temperature where it begins to melt prior to it reaching the nozzle, which could plug up the nozzle. Typically, what happens is that a feed failure causes the filament to break or be prevented from being extruded by the nozzle, where the machine does not detect this failure and continues with its print routine.

A typical feed mechanism for an FDM printer employs a roller bearing and a drive gear, where the drive gear drives the filament by applying pressure against the roller bearing. More specifically, the roller bearing provides a radial force on the filament as it is being driven by the drive gear. It is believed that this type of feed mechanism is a major contributing factor to feed failures because the force on the filament that drives it to the nozzle is a point source at the location where the drive gear contacts the filament, which is not at the center of the filament, and which causes a bending moment to be applied to the filament. Further, the contact pressure of the drive gear on the filament sometimes operates to remove material from the filament, thus reducing the contact force on the filament that drives the filament into the nozzle.

SUMMARY

The present invention discloses and describes a feed mechanism for feeding a filament through a print head assembly in an FDM printer. The feed mechanism includes a first oval-shaped track having a plurality track elements extending around the first track and a second oval-shaped track having a plurality of track elements extending around the second track, where the first and second tracks counter-rotate. A space is defined between the first and second tracks that receives the filament in a manner so that the track elements that are in the space contact the filament, where rotation of the first and second tracks in opposite directions causes the filament to be driven through the space and onto the print head.

Additional features of the present invention will become apparent from the following description and appended claims, taken in conjunction with the accompanying drawings.

BRIEF DESCRIPTION OF THE DRAWINGS

FIG. 3 is an illustration of a known feed mechanism employed in the print head shown in FIG. 2;

FIG. 4 is an illustration of a re-circulating linear feed mechanism that can be employed in the print head assembly shown in FIG. 2; and FIG. 5 is an isometric view of a track element removed from feed mechanism shown in FIG. 4.

DETAILED DESCRIPTION OF THE EMBODIMENTS

The following discussion of the embodiments of the invention directed to a feed mechanism for an FDM printer including first and second oval-shaped tracks is merely exemplary in nature, and is in no way intended to limit the invention or its applications or uses.

Figure 1:
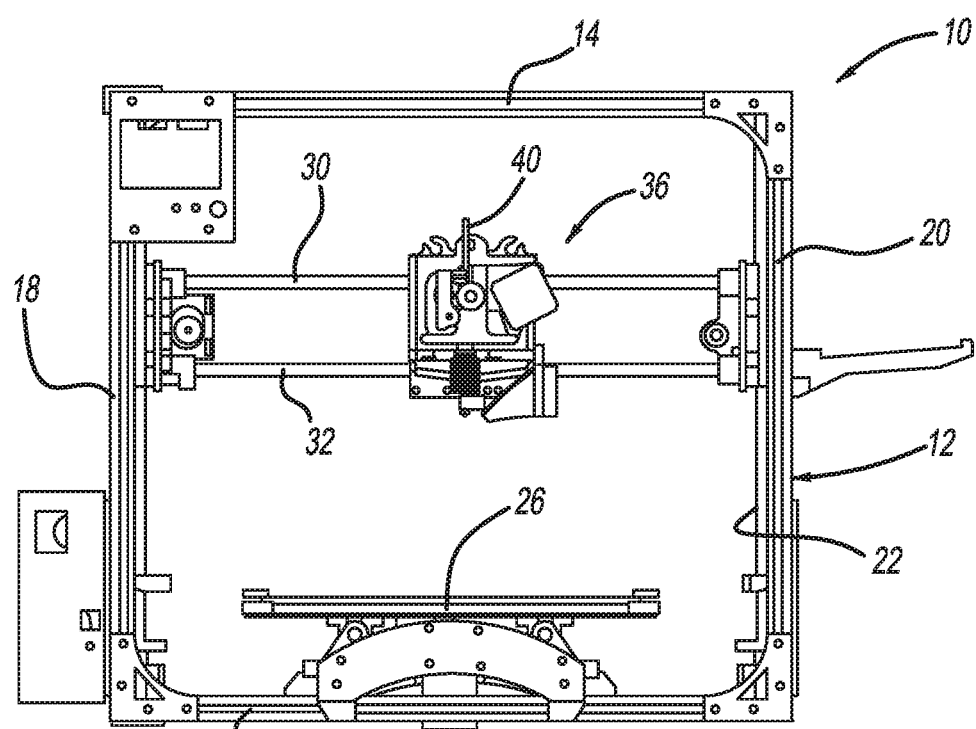
FIG. 1 is front view of an FDM printer.

FIG. 1 is a front view of a known FDM printer 10 of the type generally discussed above. It is noted that the specific configuration of the printer 10 is provided for general discussion purposes only in that the feed mechanism of the invention discussed in detail below can be employed in other FDM printers having different designs and configurations. The printer 10 includes an outer support structure 12 having top and bottom support members 14 and 16 and side support members 18 and 20 defining an enclosure 22. A movable platform 26 on which the component (not shown) being printed will be deposited in a layered configuration is positioned on the bottom member 16 within the enclosure 22. A pair of parallel rails 30 and 32 is mounted to the side members 18 and 20 and extends across the enclosure 22 in any suitable manner.

Figure 2:
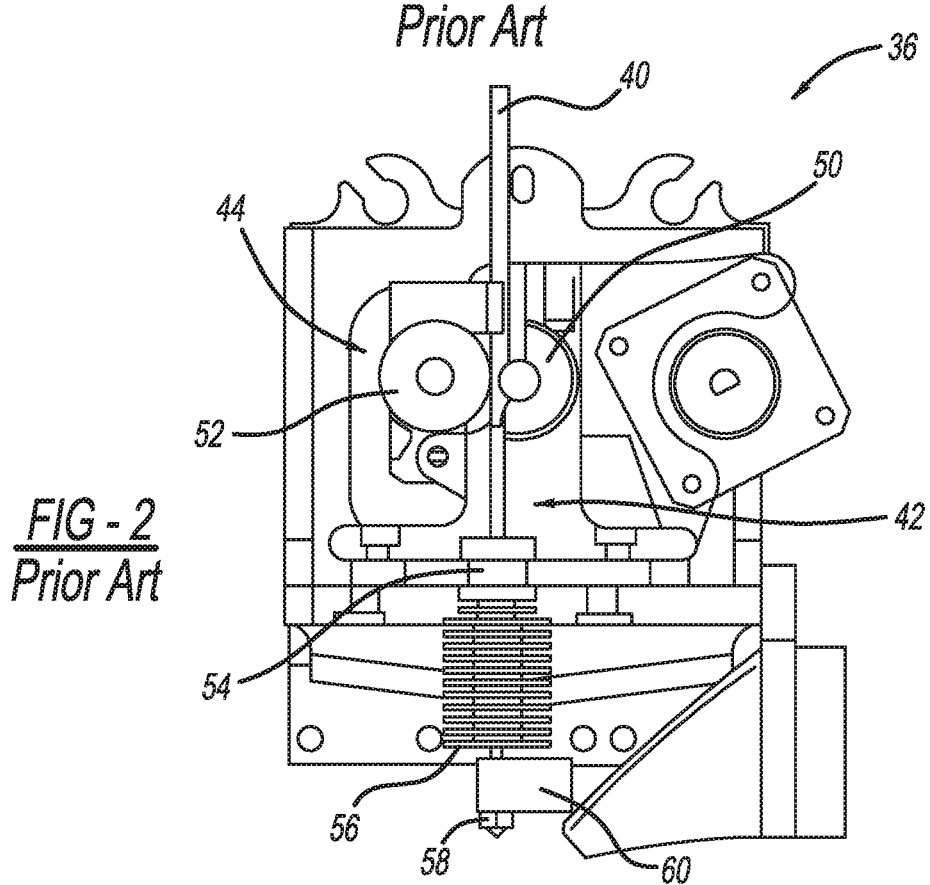
FIG. 2 is a front view of a print head removed from the printer shown in FIG. 1.

A print head 36 is slidably mounted to the rails 30 and 32 so as to be controllably positioned along the rails 30 and 32 relative to the platform 26. FIG. 2 is a front view of the print head 36 separated from the printer 10, where some of the parts of the print head 36 have been removed for clarity purposes. A filament 40 is drawn into a print head assembly 42 in the print head 36 from, for example, a spool (not shown) of the filament material by a feed mechanism 44 positioned in the print head assembly 42. The feed mechanism 44 includes a drive gear 50 and a roller bearing 52 that draws the filament 40 through a feed channel 54, then through a heat sink 56 and into a nozzle 58 that is heated by a heat source 60. The heated filament material is then extruded by the nozzle 58 so that it is laid down on the platform 26 in a configuration that is controlled by the position of the print head 36 on the rails 20 and 22 and the orientation of the platform 26 in a manner well understood by those skilled in the art.

FIG. 3 is an illustration of a feed mechanism 70 that is similar to the feed mechanism 44 to better illustrate the operation of the feed mechanism 44. The feed mechanism 70 includes a drive gear 72 having gear teeth 74 and a roller bearing 76 defining a space 78 therebetween. A filament 80 is drawn through the feed mechanism 70 by the gear 72 by applying pressure to a side of the filament 80 against the bearing 76. Because the pressure applied by the gear 72 causes a point source load against the filament 80 at location 82, and which creates a force off-set from the center of the filament 80, as represented by arrow 84, the issues with filament buckling and the like discussed above are created.

The present invention proposes replacing the feed mechanism 44 in the print head assembly 42 with a different type of feed mechanism that prevents filament buckling. Specifically, FIG. 4 is an illustration of a re-circulating linear feed mechanism 90 that can replace the feed mechanism 44. The feed mechanism 90 includes a first oval-shaped track 92 and a second oval-shaped track 94 defining a space 114 therebetween, where the tracks 92 and 94 operate similarly to a tank tread. The first track 92 is driven by a drive gear 96 at one end of the track 92, where the drive gear 96 includes teeth 98 and rotates on an axle 100 that is driven by, for example, a motor (not shown). An opposite end of the track 92 is configured on a roller 102 that rotates on an axle 104 as the track 92 is driven. The second track 94 is driven on a first roller 106 that rotates on an axle 108 at one end of the track 94 and a second roller 110 that rotates on an axle 112 at an opposite end of the track 94, where the tracks 92 and 94 are counter-rotating, as discussed in more detail below. A plurality of equally spaced apart track elements 116 are mounted to the first track 92 on pins 118 and extend completely around the track 92, and a plurality of equally spaced apart track elements 120 are mounted to the track 94 on pins 122 and extend completely around the track 94. The drive gear 96 drives the track 92 in the clockwise direction so that the track elements 116 enter and exit the space 114 between the tracks 92 and 94. The track elements 116 engage and intermesh with the track elements 120 in the space 114 so that rotation of the track 92 in the clock-wise direction causes rotation of the track 94 in a counter-clockwise direction.

FIG. 5 is an isometric view of one of the track elements 116 separated from the track 92, where the track elements 120 are identical. The track element 116 includes a mounting portion 128 having a notch 132 and a bore 126 that accepts one of the pins 118. The track element 116 also includes a contact portion 134 that extends perpendicular to the mounting portion 128, and has a width about the same size as the notch 132. The contact portion 134 includes a semi-circular opening 138 and a bore 136 that accepts an adjacent one of the pins 118. The mounting portion 128 is positioned within the track 92 so that the contact portion 134 of an adjacent track element 116 is positioned within the notch 132, where the same pin 118 extends through the bores 126 and 136 of the adjacent elements 116 so that the particular pin 118 causes the adjacent track elements 116 to be pivotally coupled together.

As the tracks 92 and 94 counter rotate, the track elements 116 and 120 move into and out of the gap 114 in a "zipper" type engagement so that the openings 138 in the elements 116 and 120 align with each other when the track elements 116 and 120 are in the gap 114. A filament 140 is threaded into the gap 114 and through the openings 138 so that as the tracks 92 and 94 rotate, the track elements 116 and 120 in the gap 114 grab the filament 140 and drive it through the space 114 to a heater 142 where the filament 140 is heated to be extruded by an extrusion nozzle 144, as discussed above.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A feed mechanism for feeding a filament through a print head assembly in a fusion deposition modeling (FDM) printer, said feed mechanism comprising:
   a first track including a plurality of first spaced apart track elements extending around the first track, said first track being driven in one direction by a drive gear; and
   a second track including a plurality of second spaced apart track elements extending around the second track, wherein a plurality of both of the first track elements and the second track elements intermesh in a space between the first and second tracks so that as the first track is being driven contact between the first track elements and the second track elements in the space causes the second track to rotate in an opposite direction, and wherein the filament is positioned in the space and in contact with the first and second track elements therein so that rotation of the first and second tracks in opposite directions causes the filament to be driven through the space, and wherein the first and second tracks are oval shaped.

2. The feed mechanism according to claim 1 wherein the drive gear is provided at one end of the first track and a roller is provided at an opposite end of the first track on which the first track rotates, and wherein a roller is provided at one end of the second track and a roller is provided at an opposite end of the second track on which the second track rotates.

3. The feed mechanism according to claim 1 wherein the first track rotates in a clock-wise direction and the second track rotates in a counter-clockwise direction.

4. The feed mechanism according to claim 1 wherein the first and second tracks include the same number of track elements.

5. The feed mechanism according to claim 1 wherein the first and second track elements are coupled to the first and second tracks by two pins where each pin engages two adjacent track elements.

6. The feed mechanism according to claim 1 wherein the first and second track elements each include a semi-circular opening through which the filament extends.

7. The feed mechanism according to claim 1 wherein the first and second track elements each includes a notch in which is positioned part of an adjacent track element.

8. A feed mechanism for feeding a filament through a print head assembly in a fusion deposition modeling (FDM) printer, said feed mechanism comprising:
   a first oval-shaped track including a plurality of first spaced apart track elements extending around the first track, said first track being driven in one direction by a drive gear, wherein the drive gear is provided at one end of the first track and a roller is provided at an opposite end of the first track on which the first track rotates; and
   a second oval-shaped track including a plurality of second spaced apart track elements extending around the second track, wherein a roller is provided at one end of the second track and a roller is provided at an opposite end of the second track on which the second track rotates, and wherein the first track elements and the second track elements intermesh in a space between the first and second tracks so that as the first track is being driven contact between the first track elements and the second track elements in the space causes the second track to rotate in an opposite direction, and wherein the filament is positioned in the space and in contact with and extending through semi-circular openings in the first and second track elements so that rotation of the first and second tracks in opposite directions causes the filament to be driven through the space, and wherein the first and second track elements are coupled to the first and second tracks by two pins where each pin engages two adjacent track elements.

9. The feed mechanism according to claim 8 wherein the first track rotates in a clock-wise direction and the second track rotates in a counter-clockwise direction.

10. The feed mechanism according to claim 8 wherein the first and second tracks include the same number of track elements.

11. The feed mechanism according to claim 8 wherein the first and second track elements each includes a notch in which is positioned part of an adjacent track element.

12. A fusion deposition modeling (FDM) printer, said printer comprising a print head assembly including a feed mechanism for feeding a filament through the print head assembly, said feed mechanism including a first track having a plurality of first spaced apart track elements extending around the first track, said first track being driven in one direction by a drive gear, and a second track including a plurality of second spaced apart track elements extending around the second track, wherein the first track elements and the second track elements intermesh in a space between the first and second tracks so that as the first track is being driven contact between a plurality of both of the first track elements and the second track elements in the space causes the second track to rotate in an opposite direction, and wherein the filament is positioned in the space and in contact with the first and second track elements therein so that rotation of the first and second tracks in opposite directions causes the filament to be driven through the space, and wherein the first and second tracks are oval shaped.

13. The FDM printer according to claim 12 wherein the drive gear is provided at one end of the first track and a roller is provided at an opposite end of the first track on which the first track rotates, and wherein a roller is provided at one end of the second track and a roller is provided at an opposite end of the second track on which the second track rotates.

14. The FDM printer according to claim 12 wherein the first track rotates in a clock-wise direction and the second track rotates in a counter-clockwise direction.

15. The FDM printer according to claim 12 wherein the first and second tracks include the same number of track elements.

16. The FDM printer according to claim 12 wherein the first and second track elements are coupled to the first and second tracks by two pins where each pin engages two adjacent track elements.

17. The FDM printer according to claim 12 wherein the first and second track elements each include a semi-circular opening through which the filament extends.

\* \* \* \* \*